United States Patent [19]

Fernando et al.

[11] Patent Number: 4,901,149
[45] Date of Patent: Feb. 13, 1990

[54] METHOD AND APPARATUS FOR PROVIDING AN ENHANCED TELEVISION SIGNAL

[75] Inventors: Gerard M. X. Fernando, Croydon; David W. Parker, Redhill; Peter Saraga, Wallington, all of United Kingdom

[73] Assignee: U.S. Philips Corporation, New York, N.Y.

[21] Appl. No.: 226,104

[22] Filed: Jul. 29, 1988

[30] Foreign Application Priority Data

Aug. 10, 1987 [GB] United Kingdom ............. 8718901

[51] Int. Cl.⁴ ..................... H04N 7/04; H04N 7/08
[52] U.S. Cl. ................................. 358/141; 358/105
[58] Field of Search ............. 358/141, 105, 136, 140, 358/142, 160

[56] References Cited

U.S. PATENT DOCUMENTS

| | | | |
|---|---|---|---|
| 4,575,756 | 3/1986 | Furukawa | 358/136 |
| 4,661,849 | 4/1987 | Hinman | 358/105 |
| 4,663,665 | 5/1987 | Tanaka et al. | 358/140 |
| 4,668,986 | 5/1987 | Furukawa | 358/105 |
| 4,727,422 | 2/1988 | Hinman | 358/105 |

FOREIGN PATENT DOCUMENTS 0146713 7/1985 European Pat. Off. .
WO88/00783 1/1988 PCT Int'l Appl. .
2144301 2/1985 United Kingdom .
2188509 9/1987 United Kingdom .
2188510 9/1987 United Kingdom .
2195061 3/1988 United Kingdom .

Primary Examiner—John W. Shepperd
Assistant Examiner—Michael D. Parker
Attorney, Agent, or Firm—Michael E. Marion

[57] ABSTRACT

A television signal for a television transmission system conveys a motion information signal in addition to the vision signal. At the transmission side each field of a picture is subdivided into a plurality of regions and up to a given number of the most dominant motion vectors appropriate to a region are generated. These motion vectors are transmitted as the motion information signal and in a receiver are separated from the television signal in a decoder (12). The spatially offset pixels are identified in a first spatial offset circuit (14) from a vision signal delayed by a picture memory (16) and compared in a picture information comparison circuit (17) with pixels in the corresponding field of the current picture to identify the motion vector indicating the pixel of corresponding magnitude. This is applied to an input of a second spatial offset circuit (19) a second input of which receives the delayed vision signal to produce motion compensated pixels which together with pixels from the current vision signal are up-converted and interpolated in a unit (18) to produce an up-converted vision signal.

12 Claims, 4 Drawing Sheets

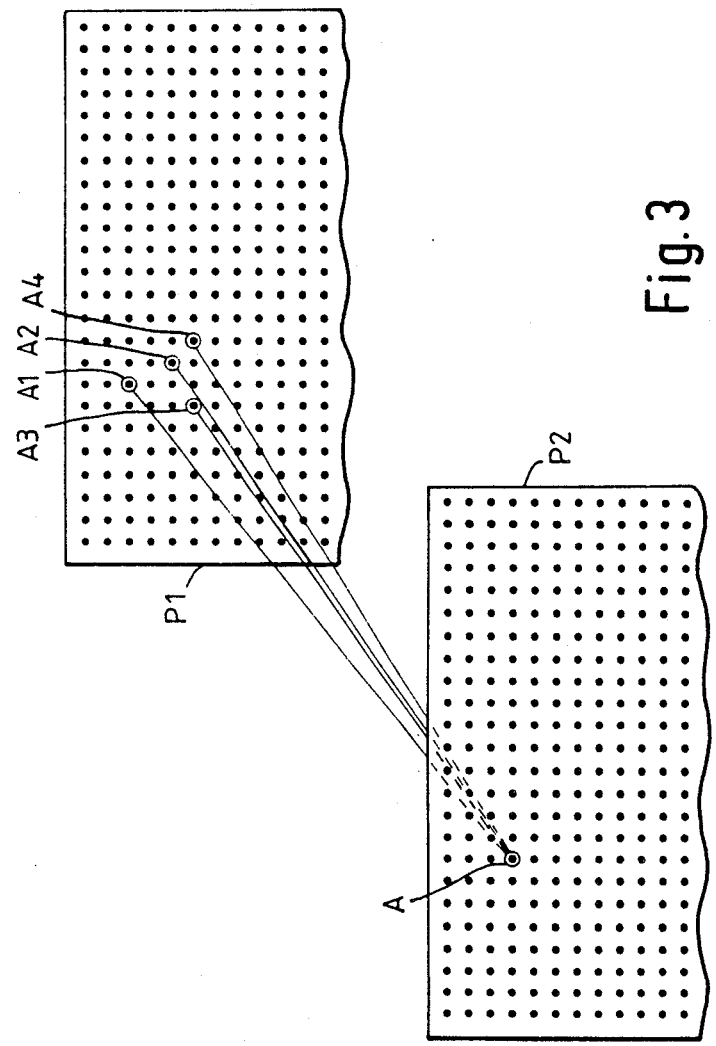

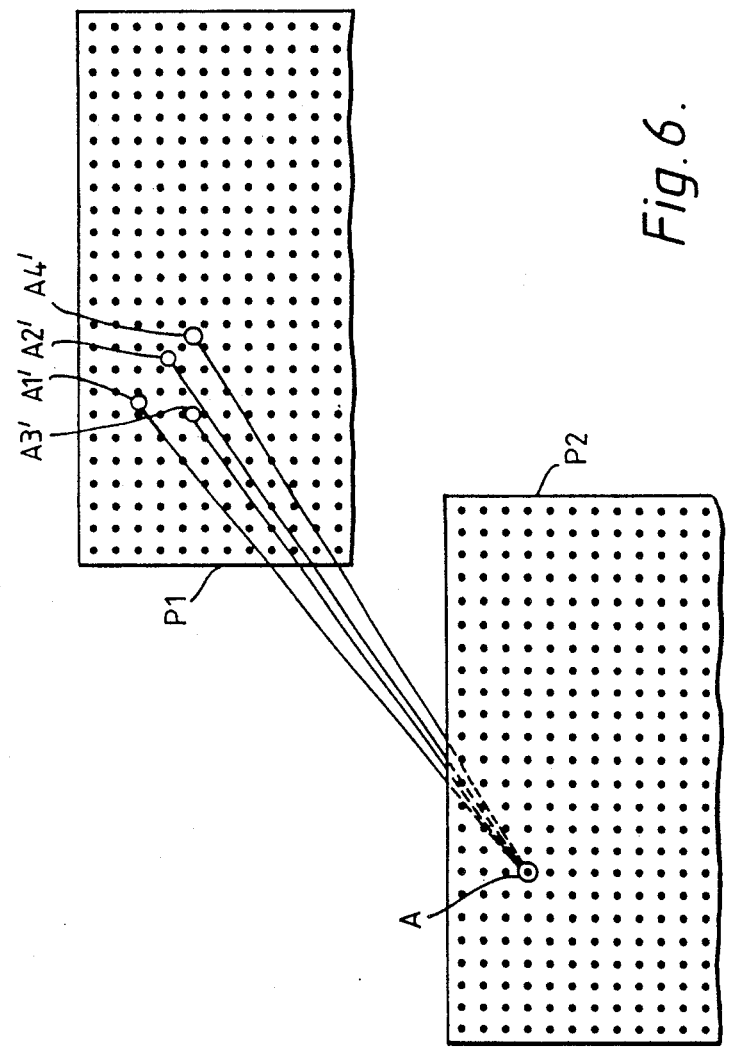

METHOD AND APPARATUS FOR PROVIDING AN ENHANCED TELEVISION SIGNAL

BACKGROUND OF THE INVENTION

This invention relates to a television transmission system comprising a signal generator for producing a television signal which comprises a vision signal representing a sequence of pictures with each picture containing a plurality of sequential or interlaced lines and further comprises a motion information signal, each field of a picture being subdivided into a plurality of regions, a transmission channel for conveying said television signal from said generator to a television receiver in which the vision signal and motion information signal in the received television signal are processed to enable a television display to be provided. The invention also relates to a signal generator and a receiver for use with such a system.

Systems of the above type have been proposed for television transmissions where it is required, at the receiver, to up-convert the received signal to provide an enhanced vision signal having either a higher number of lines and/or a higher number of picture periods per second, the motion vectors being used to derive additional vision information for the additional lines and/or pictures from that received. In some proposals the motion information signal is conveyed in digital form and such proposals have been referred to as digitally assisted television (DATV).

One such system is described in "HDTV Bandwidth Reduction by Adaptive Subsampling and Motion-Compensation DATV Techniques" by G. A. Thomas, SMPTE Journal, Volume 96, No. 5, May 1987, pages 460–465, where each field of a picture is divided into a multiplicity of small blocks with a motion vector being generated for each block. Although the range of motion vectors may be severely restricted the transmission of the individual motion vectors for a field would occupy a considerable amount of space in the television signal though this may be reduced by sending a menu of the motion vectors and pointers as to the type of vector for each block.

SUMMARY OF THE INVENTION

It is an object of the invention to provide a television transmission system capable of being used to produce an enhanced or improved quality up-converted picture, having regard to the limited bandwidth available for the motion information signal.

The invention provides a television transmission system comprising a signal generator for producing a television signal which comprises a vision signal representing a sequence of pictures with each picture containing a plurality of sequential or interlaced lines and further comprises a motion information signal, each field of a picture being subdivided into a plurality of regions, a transmission channel for conveying said television signal from said generator to a television receiver in which the vision signal and motion information signal in the received television signal are processed to enable a television display to be provided, characterized in that in the signal generator a number of motion vectors are produced for each region and up to a limited number, which limited number is an integral number greater than one, of the most dominant of the motion vectors appropriate to that region are selected, the selected motion vectors for the various regions in a field forming the said motion information signal while in the receiver a number, which corresponds to the said limited number, of comparisons are made for each picture information point in a region in at least the major part of each field between vision information in the vision signal for a region in a first field and respective offsets comprising spatially offset vision information in a corresponding field for an adjacent picture which offsets are determined by each selected motion vector appropriate to the region containing the vision information the subject of the said comparisons, and using the results of the comparisons for the regions to derive from said received vision signal, vision information for an up-converted picture signal.

Such a television transmission has the advantage that the amount of motion information is limited because the regions for which this information relates are larger than hitherto while each vision information point in each region is compared with regard to a number of motion vectors rather than a single motion vector which prevents blocking errors from occurring.

One embodiment of the system may be characterized in that in the receiver the spatial offsets given by said selected motion vectors correspond to an integral number of lines in a field and an integral number of pixels, said vision information for corresponding fields in said first and adjacent pictures corresponding to the magnitude of the pixels in the vision signal.

A further embodiment of the system may be characterized in that in the receiver the spatial offsets given by said selected motion vectors correspond to a non-integral number of lines and/or a non-integral number of pixels, said vision information for one field corresponding to the magnitude of the pixels in that field while the vision information for the corresponding field in the other picture is derived by interpolation from the pixels in that field.

Either of these embodiments may be characterized in that receiver motion vectors which are appropriately scaled versions of the selection motion vectors received with the motion information are applied to generated pixel positions in the vision information for the fields of the up-converted pictures.

The invention also provides a signal generator for use with the above television transmission system, comprising a source of vision signals, means for subdividing each picture of said vision signal into a plurality of regions, characterized in that said generator additionally comprises means for generating from said vision signal a number of motion vectors for each region, means for selecting up to a limited number, which limited number is an integral number greater than one, of the most dominant of the motion vectors appropriate to the respective region, and means for encoding said vision signal and said selected motion vectors as a television signal for application to a transmission channel.

Such a generator may be further characterized in that the motion vector generating means comprises a movement estimator for comparing blocks of pixels in a field with the corresponding and surrounding blocks of pixels in the corresponding field of an adjacent picture and for generating a motion vector for each block, and a dominant vector selector for selecting from the generated motion vectors up the said limited number of dominant motion vectors for each region.

With such generators the dominant motion vectors applied to the transmission channel may relate to the corresponding field of the picture immediately preceding that currently being transmitted in the vision signal.

The invention additionally provides a receiver for use with the above transmission system, comprising means for receiving the television signal, means for separating the vision information and the motion information from the received television signal, characterized in that the receiver additionally comprises means for deriving the said limited number of motion vectors for each region in each field from the motion information, means for comparing the vision information in a region in a field of a first picture up to said given number of times with offsets comprising spatially offset vision information in the corresponding field of an adjacent picture which offsets are determined by the said selected motion vectors appropriate to that region, and means for utilizing the results of the comparisons for all the regions in the fields for producing from the received vision signal an up-converted vision signal.

Such a receiver may be further characterized in that the comparison means comprises means for establishing the positions of the spatially offset vision information for a region, means for producing a chosen motion vector from the said limited number of motion vectors for each piece of vision information in a region, selecting from the corresponding field in the adjacent picture the appropriate spatially offset vision information by the chosen motion vector, and means for interpolating between the vision information in the field of said first picture and the appropriate spatially offset vision information in the corresponding field of said adjacent picture to produce said up-converted vision signal.

The invention also provides a method for producing a television signal which comprises a vision signal representing a sequence of pictures with each picture containing a plurality of sequential or interlaced lines and further comprises a motion information signal, said method comprising the subdivision of each field of a picture into a plurality of regions, characterized in that said method further comprises the provision of a number of motion vectors for each region and the selection of up to a limited number, which limited number is an integral number greater than one, of the most dominant of the motion vectors appropriate to that region, the selected motion vectors for the various regions in a field forming the said motion information signal.

The invention additionally provides a method for processing a television signal so to enable a television display to be provided which television signal comprises a vision signal representing a sequence of pictures with each picture containing a plurality of sequential or interlaced lines and further comprises a motion information signal, the motion information comprising up to a limited number of the most dominant motion vectors for each of a plurality of regions into which each field of a picture is subdivided, said method comprising receiving said television signal, characterized in that the method further comprises making up to a number, which corresponds to the said limited number, of comparisons for each picture information point in a region in at least the major part of each field between vision information in the vision signal for a region in a first field with spatially offset vision information in the corresponding field for an adjacent picture which offsets are determined by each selected motion vector appropriate to the region containing the vision information the subject of the said comparisons, and utilising the results of the comparisons for the regions to derive from said received vision signal vision information for an up-converted picture signal.

BRIEF DESCRIPTION OF THE DRAWINGS

The invention will now be described, by way of example, with reference to the accompanying drawings in which.

DETAILED DESCRIPTION OF THE INVENTION

FIGS. 3 to 6 are explanatory diagrams.

Figure 1:
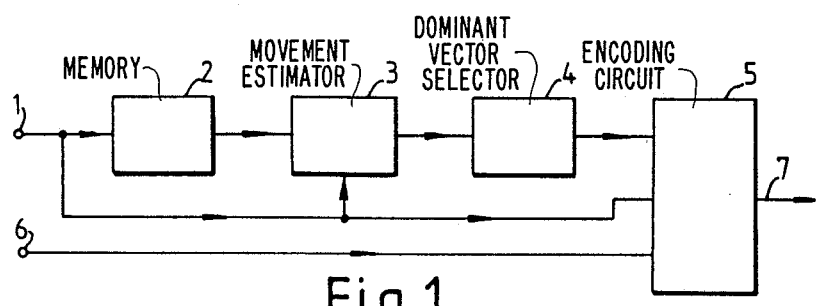
FIG. 1 is a region diagram of a signal generator for use with the transmission system according to the invention.

FIG. 1 shows a signal generator for use with the present television transmission system, an input 1 of the signal generator receiving the luminance information of a television signal which is to be transmitted. This television signal may have 625 lines with a field frequency of 50 Hz, which each picture or frame comprising two interlaced fields and derived from a standard broadcast quality camera or other suitable source. Alternatively the television signal may be a high definition television (HDTV) signal of 1249 lines interlaced over two fields with the same field frequency of 50 Hz or could be a 625 line non-interlaced signal whose single field rate is 50 Hz. In the two latter cases the television signal, after processing, could be down-converted for transmission over a transmission channel of restricted bandwith e.g. down-converted to 625 lines interlaced of 50 Hz field frequency. The luminance information at input 1 is applied to a memory 2 capable of storing a picture of the television signal, the output of the memory 2 being applied to a first input of a movement estimator 3 a second input of which receives the undelayed luminance information present at input 1. The output of the movement estimator 3 is applied to an input of a dominant vector selector 4 whose output is applied to a first input of an encoding circuit 5. A second input of the encoding circuit 5 receives the luminance information present at input 1 while a third input receives from a further input 6 the colour information of the television signal.

In operation the movement estimator 3 divides the current field of luminance information present at input 1 into adjacent blocks of 8 pixels by 8 field lines and compares each block with a block of the same size in the corresponding field in the previous picture obtained from memory 2 within a limited area surrounding the block position under investigation. If a match, within given limits, is found between compared blocks then a motion vector is assigned to the block in the current field whose value is given by the displacement of the matched block in the said corresponding field. The resulting motion vectors are applied to the dominant vector selector 4 where the motion vectors for a region in the field comprising several, say nine, blocks are assessed and a limited number, say four, of the most dominant motion vectors are selected for that region, the picture having been notionally divided into a number of regions each of a given number of pixels and a given number of lines, say 24 pixels by 24 lines. However neither the blocks nor the regions need to be regular or rectangular. As an alternative the motion vectors assigned to a region may be selected from motion vectors for blocks both inside and adjacent to but not necessarily immediately adjacent to a region. For a 625 line, 50 Hz field rate interlaced picture having 720 luminance samples per active line and 288 active lines per field the number of regions for a field would be 360 which would mean that 1440 dominant motion vectors would be produced for each field. If it is assumed that the encoding circuit 5 produces a television signal according to the specification for one of the MAC packet family then the dominant motion vectors applied to the first input of the encoding circuit could form one data service of the data burst or form part of the vertical blanking interval. This resulting number of motion vectors per field is less than half that required for a previously proposed system where a motion vector was transmitted for every block. The second and third inputs respectively receive the luminance and colour information from the inputs 1 and 6 and the encoding circuit assembles the motion vectors as motion information, together with other data, into the data burst and the luminance and colour information into the vision portion to form a MAC signal. The resulting MAC signal output from the encoding circuit 5 is applied to a transmission channel indicated by the reference 7.

Figure 2:
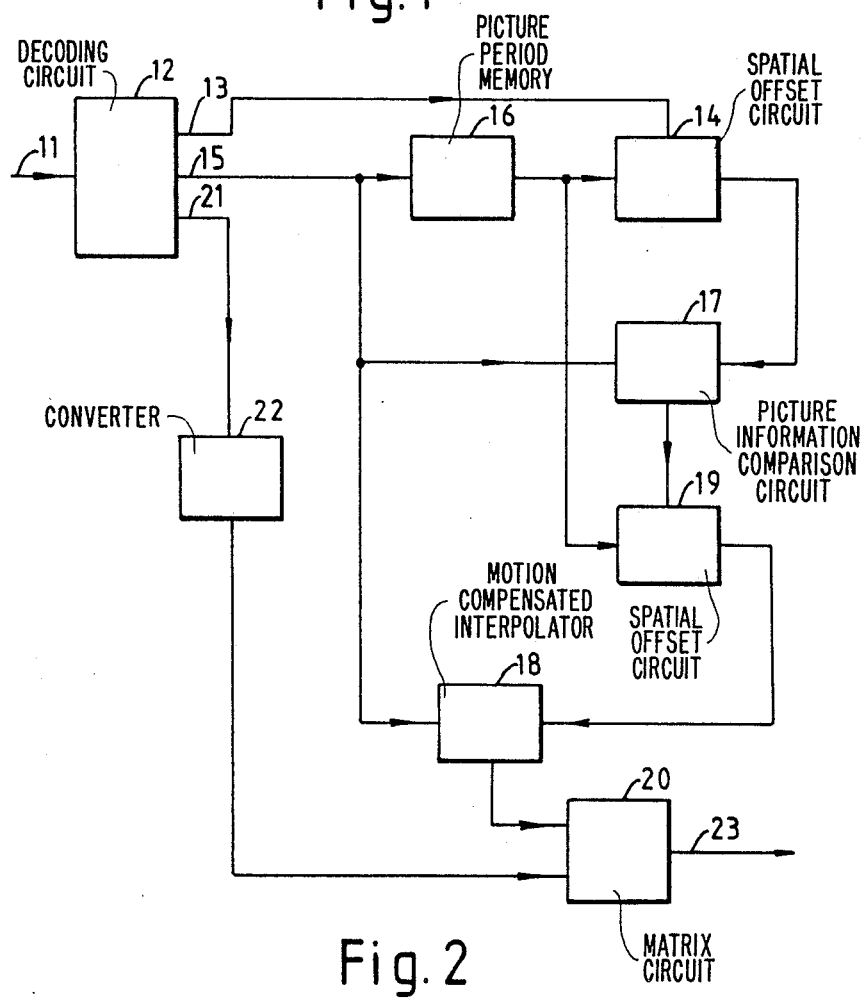
FIG. 2 is a region diagram of a receiver for use with the transmission system according to the invention.

FIG. 2 shows a receiver for use with the present television transmission system in which a receiving channel indicated by the reference 11 receives a television signal originating from the transmission channel 7 of FIG. 1. The received MAC signal applied to an input of a decoding circuit 12 which separates the data burst, blanking and vision signal into its constituent parts. Of the data received only that relating to the motion information is shown as being derived from output 13 of the encoding circuit 12 and which is applied to one input of a spatial offset circuit 14. The luminance information from the MAC television signal is derived from output 15 of decoding circuit 12 and is applied to respective inputs of a picture period memory 16, a picture information comparison circuit 17 and a converter and motion compensating interpolater 18. The output from the picture memory 16 is applied to a second input of the spatial offset circuit 14 and a first input of a further spatial offset circuit 19. The output of the first spatial offset circuit 14 is applied to a second input of the comparison circuit 17 whose output is applied to the second input of the second spatial offset circuit 19. The output of this second spatial offset circuit 19 is applied to a second input of the motion compensated interpolator 18 whose output is applied to a first input of a matrix circuit 20. A third output 21 of the decoding circuit 12 provides the chrominance information from the received television signal which is applied via a converter 22 to a second input of the matrix circuit 20. The matrix circuit 20 provides at an output 23 a signal for application to a television display (not shown) and which may be in RGB form.

Figure 5:
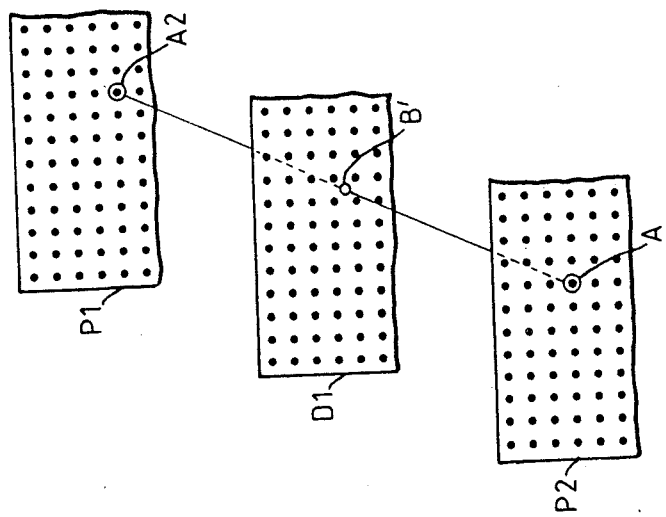
Figure 4:
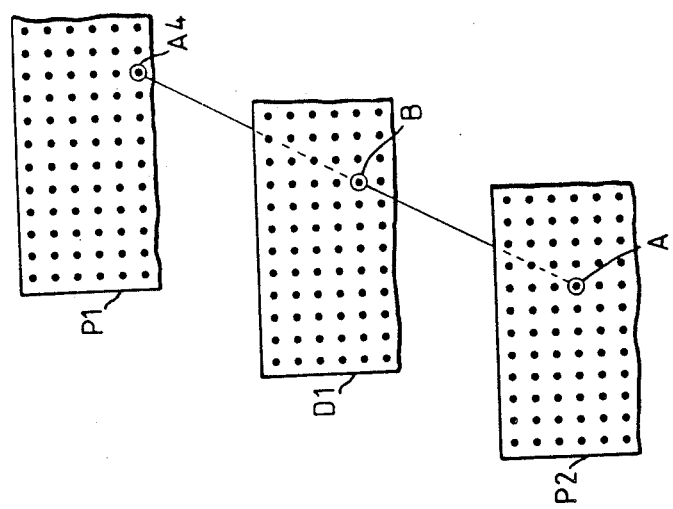

As described above, the motion information in the form of four motion vectors for each 24 by 24 region in each field is applied to the spatial offset circuit 14, these motion vectors identifying four pixel positions in the corresponding field in the previous picture. This circuit also receives the luminance information from the decoding circuit 12 delayed by one picture period. The spatial offset circuit 14 then identifies for each pixel four pixels offset by each of these four motion vectors. This is illustrated in FIG. 3 where P1 indicates part of a region from a field in a first picture derived from the picture memory 16 and P2 indicates the same part of the corresponding region in the corresponding field one picture period later. The regions in FIG. 3 show as dots the 24 pixels in the horizontal (line) direction while only 12 rows of such dots are shown in the vertical (field) direction. This figure shows that for a given pixel A in region P2 the four motion vectors for that region indicate in the corresponding region P1 the positions of the four pixels A1, A2, A3 and A4 whose magnitude will need to be examined. For the pixel A in region P2 the first spatial offset circuit 14 produces at its output the vectors of the four offset pixel in the corresponding region P1 together with their magnitudes, this being repeated for every pixel in every region for a field. The comparison circuit 17 uses this information to examine each appropriate pixel in the current field received directly at the other input of this comparison circuit to establish if one of the four selected pixels (A1 to A4) is of a corresponding magnitude (within limits) to that (A) in the current field. If such correspondence in magnitude is identified the output of the comparison circuit 17 is the motion vector indicating the pixel where such correspondence is found (say A4) and if correspondence is not found then no vector output is produced. This is repeated for each pixel in every region of a field. The selected vector is applied to the second input of the second spatial offset circuit 19 which receives at its first input the picture period delayed luminance signal, its output producing the required motion compensated pixels. The current and picture period delayed motion compensated luminance signals are applied to the respective inputs of the converter and interpolator 18 to produce at its output an up-converted luminance signal where the additional information is derived from the two signal inputs. This is shown diagrammatically in FIG. 4 which shows the same regions (P1 and P2) from the same fields of adjacent pictures where pixel A in the current picture is assumed to have the same or similar magnitude as pixel A4 in the previous picture. Reference D1 indicates the same region of the corresponding field in a derived picture generated between the two received pictures where B indicates the position of a generated pixel having the same or similar magnitude as pixels A and A4 in the received pictures. In FIG. 4 the generated pixel B in the derived picture conveniently lands on a pixel position but this will not always be the case as shown in FIG. 5 where the pixel of corresponding magnitude in picture P1 is that at A2. In FIG. 5 the corresponding point of corresponding magnitude B' does not fall on a pixel position and interpolation will be required to produce the pixels in the derived picture.

The up-converted luminance information at the output of the converter and interpolator 18 is matrixed with the chrominance information which is up-converted to the same standard by the converter 22 in the matrix circuit 20 to produce an up-converted television signal.

In the above description of FIG. 2 especially in relation to FIG. 3 the motion vectors are assumed to indicate pixels in the previous corresponding field which are offset from the given pixel by integral numbers of lines and pixels. The comparison made in the comparison circuit 17 is directly between (say) the magnitudes of pixels A and A4. This need not be the case as is shown in FIG. 6 where the motion vectors give rise to offsets between adjacent fields which are non-integral numbers of lines and pixels, shown by A1', A2', A3' and A4'. In such a case the comparison made by comparison circuit 17 is between pixel A in region P2 and information interpolated from pixels around A1', A2', A3' and A4'.

In the above description of the receiver of FIG. 2 especially in relation to FIGS. 3, 4, 5 and 6 it has been assumed that the pixels subjected to comparison are from corresponding regions of the two fields. This need not be the case and the pixels in the first of these fields may lie in a different region to those in the second of these fields. Also it has been assumed that it is possible, in the signal generator of FIG. 1, to identify four motion vectors for each region which may not be possible. If less than four or even no motion vectors can be readily identified this can be indicated.

The amount of information that is required to describe a motion vector depends on its maximum magnitude and its position. This could for instance require 16 data bits which may prove impractical to transmit for every vector in a field. One way of overcoming this would be to restrict the total number of individual vector values for a field or a portion of a field to a limited number e.g. 16. A smaller number of bits per vector e.g. 4 can then be used to identify which of the predetermined vector values apply.

The description of the signal generator of FIG. 1 and the receiver of FIG. 2 do not distinguish as to which parts of the signals and processing are analogue and which parts are digital. It will be appreciated that this is not important for an understanding of the operation and that analogue-to-digital and digital-to-analogue converters can be positioned as necessary. In addition these figures do not show compensating delays which may be necessary in some of the signal paths to compensate for transmission delays in other signal paths.

From reading the present disclosure, other modifications will be apparent to persons skilled in the art. Such modifications may involve other features which are already known in the design, manufacture and use of transmission systems, signal generators or receivers and component parts thereof and which may be used instead of or addition to features already described herein. Although claims have been formulated in this application to particular combinations of features, it should be understood that the scope of the disclosure of the present application also includes any novel feature or an novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A television transmission system comprising a signal generator for producing a television signal which comprises a vision signal representing a sequence of pictures with each picture containing a plurality of sequential or interlaced lines and further comprises a motion information signal, each field of a picture being subdivided into a plurality of regions, a transmission channel for conveying said television signal from said generator to a television receiver in which the vision signal and motion information signal in the received television signal are processed to enable a television display to be provided, characterized in that in the signal generator a number of motion vectors are produced for each region and up to a limited number, which limited number is an integral number greater than one, of the most dominant of the motion vectors appropriate to that region are selected, the selected motion vectors for the various regions in a field forming said motion information signal while in the receiver a number, which corresponds to the said limited number, of comparisons are made for each picture information point in a region in at least the major part of each field between vision information in the vision signal for a region in a first field and respective offsets comprising spatially offset vision information in a corresponding field for an adjacent picture which offsets are determined by each selected motion vector appropriate to the region containing the vision information the subject of the said comparisons, and utilizing the results of the comparisons for the regions to derive from said received vision signal vision information for an up-converted picture signal.

2. A system as claimed in claim 1, wherein the receiver the spatial offsets given by said selected motion vectors correspond to an integral number of lines in a field and an integral number of pixels, said vision information for corresponding fields in said first and adjacent pictures corresponding to the magnitude of the pixels in the vision signal.

3. A system as claimed in claim 1, wherein the receiver the spatial offsets given by said selected motion vectors correspond to a non-integral number of lines and/or a non-integral number of pixels, said vision information for one field corresponding to the magnitude of the pixels in that field while the vision information for the corresponding field in the other picture is derived by interpolation from the pixels in that field.

4. A system as claimed in claim 1, 2 or 3, wherein the receiver motion vectors are applied to generated pixel positions in the vision information for the fields of the up-converted pictures which motion vectors are appropriately scaled versions of the selected motion vectors received with said motion information.

5. A signal generator for use in the system of claim 1, comprising a source of vision signals, means for subdividing each picture of said vision signal into a plurality of regions, characterized in that said signal generator additionally comprises means for generating from said vision signal a number of motion vectors for each region, means for selecting up to a limited number, which limited number is an integral number greater than one, of the most dominant of the motion vectors appropriate to the respective region, and means for encoding said vision signal and said selected motion vectors as a television signal for application to a transmission channel.

6. A signal generator as claimed in claim 5, wherein said motion vector generating means comprises a movement estimator for comparing blocks of pixels in a field with the corresponding and surrounding blocks of pixels in the corresponding field of an adjacent picture and for generating a motion vector for each block, and a dominant vector selector for selecting from said generated motion vectors up to the said limited number of dominant motion vectors for each region.

7. A signal generator as claimed in claim 5 or 6, wherein the dominant motion vectors applied to said transmission channel relate to the corresponding field of the picture immediately preceding that currently being transmitted in said vision signal.

8. A receiver for use with the system of claim 1, comprising means for separating said vision information and said motion information from said received television signals, characterized in that said receiver additionally comprises means for deriving the said limited number of motion vectors for each region in each field from said motion information, means for comparing the vision information in a region in a field of a first picture up to said limited number of times with spatially offset vision information in the corresponding field of an adjacent picture which offsets are determined by the said selection motion vectors appropriate to that region, and means for utilizing the results of the comparisons for all the regions in said fields for producing from said received vision signal an up-converted vision signal.

9. A receiver as claimed in claim 8, wherein said comparison means comprises means for establishing the positions of said spatially offset vision information for a region, means for producing a chosen motion vector from the said limited number of motion vectors for each piece of vision information in a region, selecting from the corresponding field in said adjacent picture the appropriate spatially offset vision information by said chosen motion vector, and means for interpolating between said vision information in the field of said first picture and the appropriate spatially offset vision information in the corresponding field of said adjacent picture, to produce said up-converted vision signal.

10. A method for producing a television signal which comprises a vision signal of a continuous sequence of pictures with each picture containing a plurality of sequential or interlaced lines and further comprises a motion information signal, said method comprising the steps of:
subdividing each field of a picture into a plurality of regions,
providing a number of motion vectors for each region; and
selecting up to a limited number of the most dominant of the motion vectors appropriate to that region, the selected motion vectors for the various regions in a field forming the said motion information signal.

11. A method as claimed in claim 10, wherein said method comprises the additional steps of:
subdividing each region into a number of blocks; and
generating, where applicable, a motion vector for each block to provide said number of motion vectors from which said limited number of motion vectors are selected, said limited number being less than the number of blocks in a region.

12. A method for processing a television signal which comprises a vision signal representing a sequence of pictures each comprising a plurality of lines and further comprising a motion information signal comprising up to a first number of dominant motion vectors for each of a plurality of regions into which each field of a picture is subdivided, said method comprising the steps of:
receiving said television signal, making up to a second number, of comparisons corresponding to said first number, between each picture information point in a region in at least the major part of each field between vision information in the vision signal for a region in a first field and spatially offset vision information in the corresponding field for an adjacent picture which offsets are determined by each respective motion vector appropriate to the region containing the vision information which is the subject of the said comparisons, and utilizing the results of the comparisons for the regions to derive from said received vision signal vision information for an up-converted picture signal.

* * * * *